United States Patent [19]

Scheffler

[11] 4,175,368
[45] Nov. 27, 1979

[54] HARVESTING APPARATUS AND PROCESS

[75] Inventor: Edward D. Scheffler, Coloma, Mich.

[73] Assignee: Ag Superior, Inc., Riverside, Mich.

[21] Appl. No.: 824,815

[22] Filed: Aug. 15, 1977

[51] Int. Cl.² ............................................. A01D 46/00
[52] U.S. Cl. .................................... 56/328 R; 239/225
[58] Field of Search ...................... 56/328 R, 329, 330, 56/30, 31, 32; 239/210, 225, 177, 243, 245, 246, 263, 265, 536

[56] References Cited

U.S. PATENT DOCUMENTS

| | | | |
|---|---|---|---|
| 1,592,452 | 7/1926 | Ferris et al. | 239/225 |
| 2,970,771 | 2/1961 | Przystawik | 239/225 |
| 3,006,131 | 10/1961 | McDowell | 56/330 |
| 3,448,567 | 6/1969 | McGee | 56/328 R |
| 3,455,502 | 7/1969 | Pool et al. | 56/328 R |
| 3,690,053 | 9/1972 | Thorn | 56/328 R |
| 3,720,375 | 4/1971 | Kumaoka | 239/210 |
| 3,757,504 | 9/1973 | Rauth | 56/328 R |
| 3,871,040 | 3/1975 | Marasco | 56/328 R |
| 3,943,688 | 3/1976 | Billings | 56/328 R |
| 4,078,365 | 3/1978 | Ingalls | 56/328 R |

Primary Examiner—Russell R. Kinsey
Assistant Examiner—Paul J. Hirsch
Attorney, Agent, or Firm—Gordon W. Hueschen

[57] ABSTRACT

Apparatus and process is provided in which a blast of air is directed into the tree to be harvested from the circumference of a circle which is apposed to the foliage expanse of the tree and is caused to move about the circumference of the circle as a rotating unit which rotates about the center of the circle. A plurality of nozzles may be arranged around the circumference of the circle and the blast shifted from one nozzle to the adjacent nozzle in succession alternatively. A nozzle delivering a continuous blast of air is mounted to rotate about the circumference of the circle. The rotating units are mounted on a mobile base so that they can be drawn horizontally along a row of trees. If desired, the rotating units may be mounted on the end of a spider which in turn rotates about a fixed axis on the mobile base, in which case, three different movements are impressed one upon the other, namely, the rotating movement of the rotating unit about its own axis, the rotation of the rotating unit about the axis of the spider, and the transverse or horizontal movement of the mobile base. Advantageously, the rate of movement of the air blasts about the circumference of the circle is correlated with the normal period of the limb groupings of the tree so that, as the limb groupings move away from the air blasts, the air blasts follow and reinforces the movement and thus imparts a gyratory motion to the limb groupings.

30 Claims, 11 Drawing Figures

HARVESTING APPARATUS AND PROCESS

BACKGROUND OF THE INVENTION

1. Field of Invention and Prior Art

This invention relates to harvesting apparatus and process and is particularly directed to apparatus and process for harvesting fruit from fruit-bearing trees.

With the development of abscission-promoting materials such as ACTI-AID™, mechanical harvesters designed to shake the limbs of a tree have been developed. Effective such mechanical harvesters are provided with means for causing blasts of air to impinge on fruit-bearing limbs to set them in motion to shake the fruit from the limbs. U.S. Pat. No. 3,943,688, for example, discloses a harvesting machine of the class described with louvers adapted to direct air blasts upwardly or downwardly either in unison or in non-unison. Also, U.S. Pat. No. 3,870,040 discloses a harvester for directing pulsating jets of compressed air into the tree. U.S. Pat. No. 3,757,504 discloses parallel vertical columns having means therein to direct blasts of air toward the center of the tree with means to cause the air to be directed upwardly or downwardly in a random manner for the height of each column. U.S. Pat. No. 3,310,231 is similar to U.S. Pat. No. 2,943,688, but uses the means of U.S. Pat. No. 3,757,504 for causing the blast or jet of air to be directed upwardly or downwardly in a random manner.

U.S. Pat. No. 3,114,998 discloses a harvesting means for directing jets of air downwardly, sideways, and upwardly into the tree, and U.S. Pat. No. 2,455,502 discloses means for directing a high-velocity blast of air into the top of the tree to knock the fruit therefrom into a wagon.

Still another harvester which employs a pulsating air blast to remove oranges that have been treated with an abscission chemical, is disclosed in *The Citrus Industry*, Vol. 57, August 1976, page 15. Three fans are stacked vertically and are powered in a way, not shown, to produce a pulsating air blast.

The prior art does not disclose the salient features of this invention, which will be described more particularly below, of directing a blast of air into the tree to be harvested from the circumference of a circle which is apposed to the foilage expanse of the tree and causing said air blasts to move about the circumference as a rotating unit which rotates about the center of the circle.

In my copending application Serial No. 824,712, filed of even data hereof, for Apparatus and Process for Harvesting Fruit, I have disclosed apparatus and process having subject matter common to this application. Such common subject matter will be claimed in the present application and so much of the disclosure thereof as is pertinent to the common subject matter is incorporated herein by reference.

OBJECTS OF THE INVENTION

It is an object of the invention to provide new and improved apparatus and process for air-harvesting of fruit. It is a further object of the invention to provide such apparatus and process in which a blast of air is directed into the tree to be harvested from the circumference of a circle which is apposed to the foilage expanse of the tree and the blast of air caused to move about the circumference of the circle as a rotating unit which rotates about the center of the circle. It is a further object of the invention to provide apparatus and process of the class described which has improved efficiency. It is a further object of the invention to provide apparatus and process of the class described in which more fruit is recovered per unit of of power expended. It is a further object of the invention to provide apparatus and process of the class described in which one or more different motions are impressed upon the motion of the air blasts about the circumference of the circle. It is still a further object of the invention to avoid the disadvantages of the prior art and to obtain advantages as will appear as the description proceeds.

BRIEF DESCRIPTION OF THE INVENTION

The invention relates to apparatus and process for harvesting fruit from trees in which a blast of air is directed into the tree from the circumference of a circle which is apposed to the foilage expanse of the tree and caused to move about that circumference as a rotating unit which rotates about the center of the circle. Advantageously, the rate at which the blast moves about the circumference of the circle is so correlated, with the natural period of the limb groupings of the tree, that the movement of the limb groupings induced by the air blasts is continuously reinforced by the moving air blasts, whereby a gyratory motion will be imparted to the limb groupings apposed to the circumference of the circle about which the air blasts move.

In accordance with one form of the invention, a plurality of nozzles is spaced along the circumference and oriented to direct a blast of air into the foilage of the tree and the air blast is shifted from one nozzle to the next in succession so that the effect is that of the air blast moving about the circumference of the circle. In one form of this modification, a plurality of louvers radiating from one annulus to another are mounted in front of a rotary blower having a rotary gate interposed between the louvers and the blower, having an aperture in alignment with the louvers, whereby as the gate is rotated, high speed air from the blower is admitted to the louvers in succession.

In accordance with another form of the invention, one or more nozzles adapted to deliver a continuous blast of air are mounted for movement about the circumference of the circle. In one form of this modification, a blower is arranged to deliver high-speed air to at least two nozzles diametrically opposed, which are mounted to rotate as a unit about a common center. The nozzles may be connected to a common conduit which in turn is connected to the blower. Alternatively, the nozzles may project from a face plate mounted on the discharge end of the blower and the whole unit mounted for rotation.

In all forms of the invention, it is of advantage to have the air blasts oriented to angle into the trees in the direction of rotation.

Also, in all modifications of the invention, it is of advantage to have the diameter of the circle, about which the air blasts rotate, relatively small with reference to the foilage expanse of the tree and to move the rotating unit across the foilage expanse of the tree, either vertically, horizontally, or on the circumference of a larger circle. Advantageously, the diameter of the circle about which the air blasts rotate is between about one-fourth and one-half of the height of the foilage expanse of the tree, in which case the entire expanse of the tree can be covered by moving the air blasts up and down across the foilage expanse of the tree either in a rectilinear motion or in a curvilinear motion, or by stacking a plurality of rotating units, one on top of the other, as required, to cover the vertical expanse of the foliage portion of the tree.

In accordance with another form of the invention, the rotating units are mounted for rotation on ends of a spider which in turn is mounted for rotation on a support rigidly supported by a mobile base. In this modification, the rotating units, advantageously, comprise compound blowers with a nozzle connected with each section of the compound blower and mounted to direct a blast of air inwardly toward the tree. Means is provided for causing the impellers in the blowers to rotate and for causing the spider to rotate. As disclosed in my copending application, the means for rotating the blowers and the means for rotating the spider may be arranged so that the two rotate at the same speed. Thus, in the traverse of the rotating units across the tree, the nozzles of the blowers always maintain the same orientation. In accordance with the improved form described herein, these two means are separate, whereby the rotating units can be rotated at a speed which is different from that at which the spider rotates. In this way, the speed of the rotating units can be adjusted to conform with the natural period of the limb groupings in order tha a gyratory motion can be imparted thereto.

In one form of the invention where one rotating unit is stacked on another, the air blasts of one unit rotate in the opposite direction to those of the other unit. In this way, the limb groupings of one unit tend to gyrate in one direction and those of the other in the opposite direction and, when the gyrating effect is large enough, the limb groupings of one unit will collide head-on with the limb groupings of the other unit.

Thus, in the preferred aspects of the invention, air blasts from a rotating unit are caused to impinge on fruit-laden limb groupings in such a manner as to cause the limb groupings to gyrate. In this way, the stresses placed on the abscission layers become greater and greater as the gyration becomes greater and greater so that at one point or another, the fruit will be caused to separate and the basic object of the invention accomplished.

Advantageously, the air blast-producing means is oriented to direct the blast of air inwardly toward the axis of rotation. An angle of about 45 degrees is suitable, though it is understood that the angle can range from zero, that is, the straight-out position, to about 60 degrees. It is also of advantage, in some cases, to have the air blast-producing means oriented to angle the air blast in the direction of rotation. Here, again, an angle of about 45 degrees is suitable, though it is understood that the angle can range from about zero to about 60 degrees. In some cases, also, it is of advantage to have the air blast-producing means angle both inwardly toward the center and at an angle toward the direction of rotation. Here, again, the angle can be about 45 degrees with the understanding that it can range from about zero to about 60 degrees. The orientation, however, will be such that the air blast-producing means will angle in part way toward the axis and part way toward the direction of rotation. In some cases, it is desirable to provide a plurality of air blast-producing means rotating in a common rotating unit with some oriented one way and some oriented another way.

In operation of the device in accordance with the invention, the air blasts, advantageously, travel between about 140 and 200 miles per hour. Air blasts of much greater velocity than this are undesirable as they tend to blow through the trees and blow off foliage as well as fruit. When additional power is desired to be transmitted to the limb groupings to obtain the desired gyratory action, this can be accomplished by increasing the volume of the air blasts. In this way, more power is imparted to the limb groupings influenced by the air blasts without requiring any increase in the velocity of the air blasts.

DETAILED DESCRIPTION OF THE INVENTION

Figure 1:
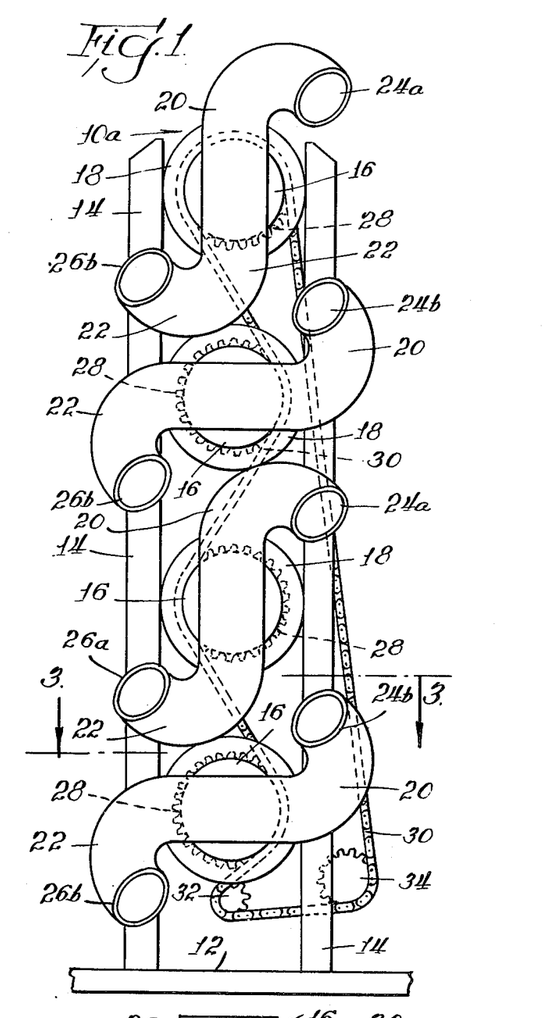
FIG. 1 is a face view of one form of the invention.
Figure 2:
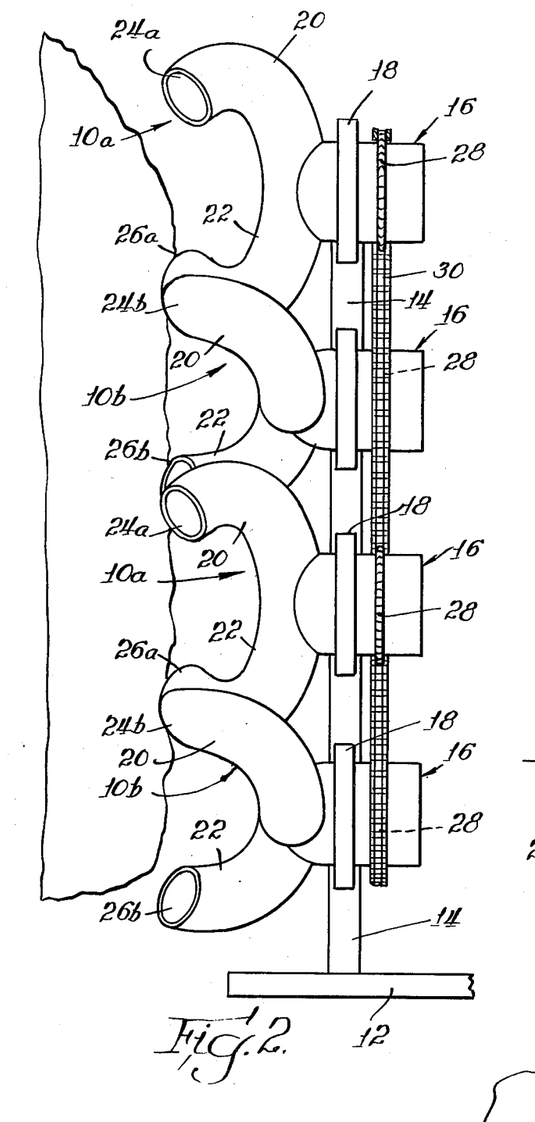
FIG. 2 is a side view of FIG. 1.
Figure 3:
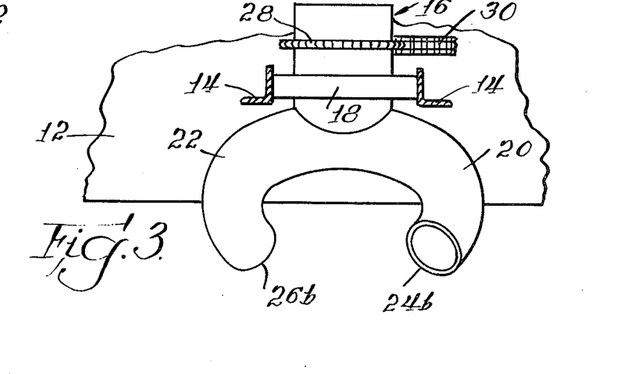
FIG. 3 is a partial plan view taken along line 3 of FIG. 1.

Referring now particularly to FIGS. 1, 2, and 3, there is illustrated a form of the invention which has a plurality of rotating units 10 stacked in vertical alignment. The units are supported by a mobile base 12 and vertical supports 14.

The rotating units 10 comprise tubular blower conduits 16 depending on ring bearings 18 rigidly affixed to the supports 14. Thus, the tubular blower conduits 16 are located at spaced intervals on the blower support 14 and are free to rotate in the ring bearings 18.

The tubular conduit 16 is bifurcated at its forward end into two arms 20 and 22 which terminate in nozzles 24 and 26.

Each of the tubular conduits 16 is provided with a sprocket 28 which is linked together by chain 30 which passes alternately from the side of one sprocket to the opposite side of the other and so on, and finally passes over an idler sprocket 32 and a driven sprocket 34. Since the chain 30 alternates back and forth on the sprockets 28, the alternating rotating units 10 will rotate in opposite directions. Thus unit 10a will rotate in a clockwise direction and units 10b will rotate in a counter-clockwise direction.

The nozzles 24a and 26a are angled inwardly toward the tree and into the direction of rotation, that is, into the clockwise direction, whereas the nozzles 24b and 26b are angled in the opposite direction, that is, in toward the tree and in the counter-clockwise direction. The nozzles 24 and 26 are also angled in toward the axis of rotation.

When the driven sprocket 34 drives chain 30, the rotating units 10a rotate in the clockwise direction and the rotating units 10b rotate in the counter-clockwise direction. Also, the rotating units 10a and 10b are oriented 180 degrees apart so that the respective rotating units can be stacked closer together.

In operation, the blast of air discharged from the nozzles 24a and 26a will operate to cause the limb grouping, to which they are apposed, to gyrate in a counter-clockwise direction facing into the tree and the nozzles 24b and 26b will cause the limb groupings, to which they are opposite, to tend to gyrate in a clockwise direction facing the tree. When the gyrations reach sufficient magnitude, the limbs from one limb grouping will collide head-on with limbs of the limb grouping next above. This has the advantage that even the most firmly attached fruit will be knocked off.

The whole unit is mounted on a mobile base 12 for movement along a row of trees or around a single tree so that the rotating units can pass from one grouping to an adjacent grouping in succession so that successive limb groupings are successively set in gyratory motion.

The rate at which the rotating units 10 rotate is correlated with the natural period of the limb groupings so that, as the air blast from one nozzle 24 impinges on a limb, it will follow that limb around and continuously reinforce the movement of that limb until the desired gyratory effect is obtained. For this purpose, the driven sprocket 34 is advantageously driven by a hydraulic motor, not shown, since the speed of such motors is continuously variable, according to the setting of the valve supplying hydraulic fluid to the motor.

In the optimum operation, in accordance with the invention, the speed of the driven sprocket 34 will be manually controlled so that the operator can develop the desired gyratory action by starting the rotation out slowly and speeding it up at just the right rate to obtain the desired gyration. In the practical application of the invention, however, the speed of rotation may be set in accordance with the size of the trees being harvested, and left that way, since if the blast from one nozzle overruns a limb or limb grouping, the next nozzle of that unit will catch that limb grouping. Thus, the rotating units 10 can be rotated at a speed considerably greater than the natural moment of the limb groupings of the tree and will still be effective to set them into a gyratory motion, and this particularly when the rotary motion of the rotating units is impressed on a transverse motion of the mobile base, whereby the resulting path taken by the nozzles 24 and 26 is epicyclic.

The term "epicyclic" as used herein is in accordance with the definition 1-b of *Webster's New Third International Dictionary*, G. and C. Merriam Co., Springfield, Massachusetts, U.S.A., (1963), as follows: "a process or activity going on within the context of a larger one." In this case, the process or activity is movement. Thus, an epicycle obtains when the first movement is impressed upon the second movement and an epiepicycle obtains when these two movements are impressed upon the third.

Figure 4:
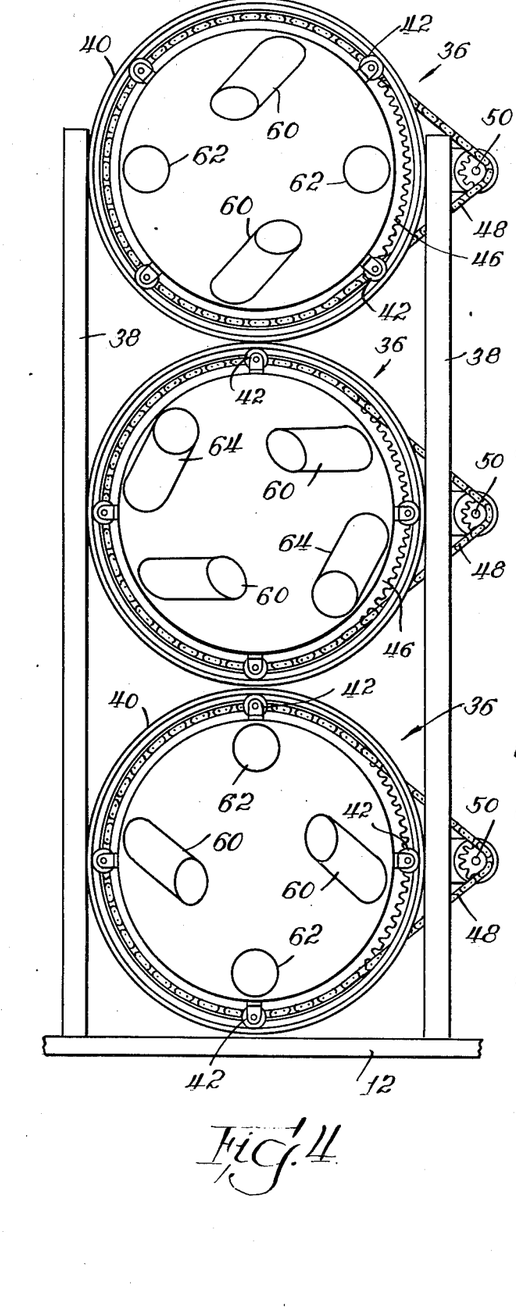
FIG. 4 is a face view of a modified form of the invention.
Figure 5:
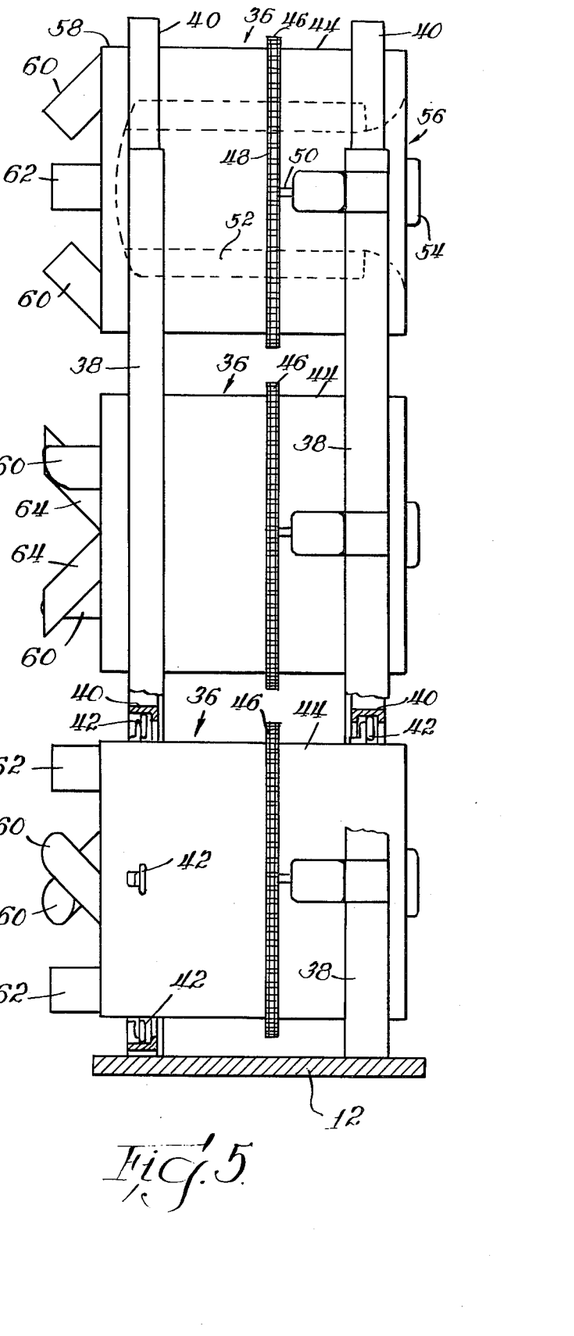
FIG. 5 is a side view of FIG. 4.

In FIGS. 4 and 5, there is shown another modification in which a plurality of rotary fans 37 are mounted in stacked vertical relation on the mobile base 12 by supporting members 38. Affixed to the vertical supports 38 at proper intervals are circular races 40 adapted to receive the rollers 42 interposed between the races 40 and the outer housing 44 of rotary fan 36. Mounted on the housing 44 is an annular sprocket 46 linked by chain 48 to a driven sprocket 50. The driven sprockets 50 can all be driven by the same hydraulic motor, not shown, or by separate hydraulic motors so that the speed of the rotation can be separately varied among the several units.

The rotary fan 36 comprises an impeller 52 of the squirrel-cage type driven by a suitable hydraulic motor 54. Air is admitted at 56 driven by the impeller to the annular space between the housing 44 and the impeller 52 and normally forced out the outlet end.

In the structure herein described, however, the outlet end is covered by a face plate 58 which is provided with a plurality of nozzles 60, 62, and 64, arranged about the periphery of the face plates 58 with their inlet ends opposite the discharge of the rotary fan. Thus, the air drawn in through the inlet 56, which is driven by the impeller 52 up into the annular space between the fan housing 44 and the impeller 52, and out through the nozzles 60, 62, and 64. The rotation of the fan units thus causes a rotation of the nozzles about the circumference of a circle and directs the air blasts into the foliage expanse of the tree in the same way that the nozzles 24 and 26 of FIGS. 1 and 2 direct the air blasts into the foliage expanse of the tree.

At least some of the nozzles, as shown at 60, are oriented to direct the air inwardly toward the tree, inwardly toward each other, and to angle it in to the direction of rotation. This is the orientation described in connection with FIGS. 1 and 2. It sometimes desirable, however, to have at least some of the nozzles directed axially into the tree. These are illustrated by nozzles 62. In other cases, it is desirable to have the nozzles angle into the direction of rotation, as shown by nozzles 64.

It will be understood that each of the groups of rotating nozzles mounted on the respective face plates can have all of the nozzles oriented in the same direction, or they can have them mixed, as shown. It is also to be understood that while four nozzles are shown for each face plate, the number of nozzles can be varied from one to any greater practical number. For practical purposes, however, it is preferred to have four nozzles and to have them all oriented as nozzles 60 as, in this way, the proper degree of rotation of the air blast is obtained without excessive rotational speed of the fan units.

In the preferred form of the invention shown in FIGS. 4 and 5, the nozzles 60 form an angle with an axial plane intercepting them of about 45 degrees, plus or minus about 15 degrees. Also, the same nozzles form an angle with the plane of the face plate 58 of about 45 degrees, plus or minus 15 degrees. In the broader aspects of the invention, though, the angles may angle from zero degrees, that is, straight out, to about 60 degrees, that is, with reference to the face, and they can angle, with preference to an axial plane, i.e., a plane through the axis of the rotary fan, from a position in said plane as represented by nozzles 62 to an angular position as represented by nozzles 60 and 64. The orientation of the nozzles in FIGS. 1, 2, and 3 can similarly be referred to an axial plane through the axis of the rotating conduit 16 and to a radial plane, which corresponds to the face plate 58 of FIGS. 4 and 5.

Figure 6:
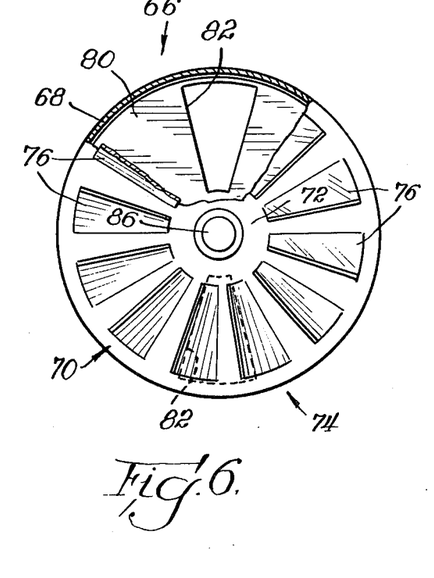
FIG. 6 is a face view of a modified form of the invention.
Figure 7:
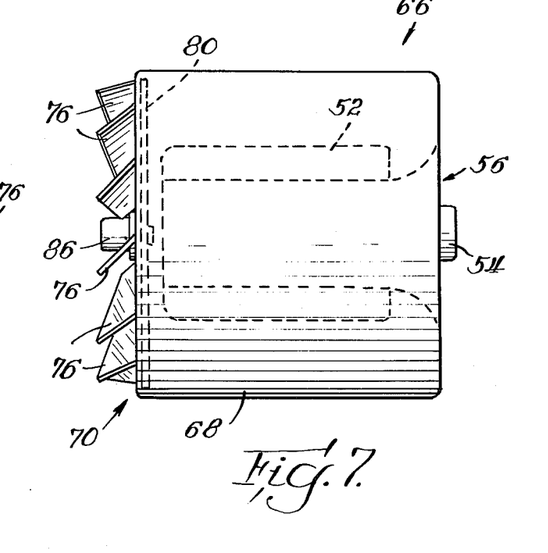
FIG. 7 is a side view of FIG. 6.

In FIGS. 6 and 7, there is illustrated a further modification of the invention in which a rotary fan 66 is mounted on a mobile base 12, not shown in these figures, by vertical supports 38, not shown in these figures, but shown in FIGS. 4 and 5. In this modification, housing 68 of the rotary fan 66 is rigidly fixed to the supports 38 and does not rotate relative thereto. The rotary fan 66 is provided with a face plate 70 which is unitary with the housing 68. The face plate 70 has a central circular intact portion 72 and an annular portion 74 provided with louvers 76. Thus, the louvers 76 are opposite the annular discharge portion of the rotary fan 66. Between the discharge end of the rotary fan 66 and the face plate 70, is located a rotary valve 78 which comprises a valve plate 80, having one or more apertures 82 adapted to register with one or more of the louvers 76. The valve plate 80 is mounted for rotation on axis 84 which is driven by hydraulic motor 86 mounted at the center of the circular portion 72. Thus, the rotary valve 78, in rotating, brings the apertures 82 successively into communication with successive louvers so that the blast of air is continually shifting from one louver to the next adjacent louver in succession so that the air blasts are continually moving around the circumference of the circle, the center of which is the axis 84. Advantageously, the louvers are bent at an angle into the direction of rotation for the purpose already described and the angle at which they are bent can range from zero degrees, that is, straight out, to about 60 degrees. Preferably, the angle is about 45 degrees, as in the other modifications. They can also be oriented to line up with the radii of the face plate 70 or to be at an angle thereto, so that the air blast can be angled in all the ways described for the modifications of FIGS. 1 through 5.

Figure 8:
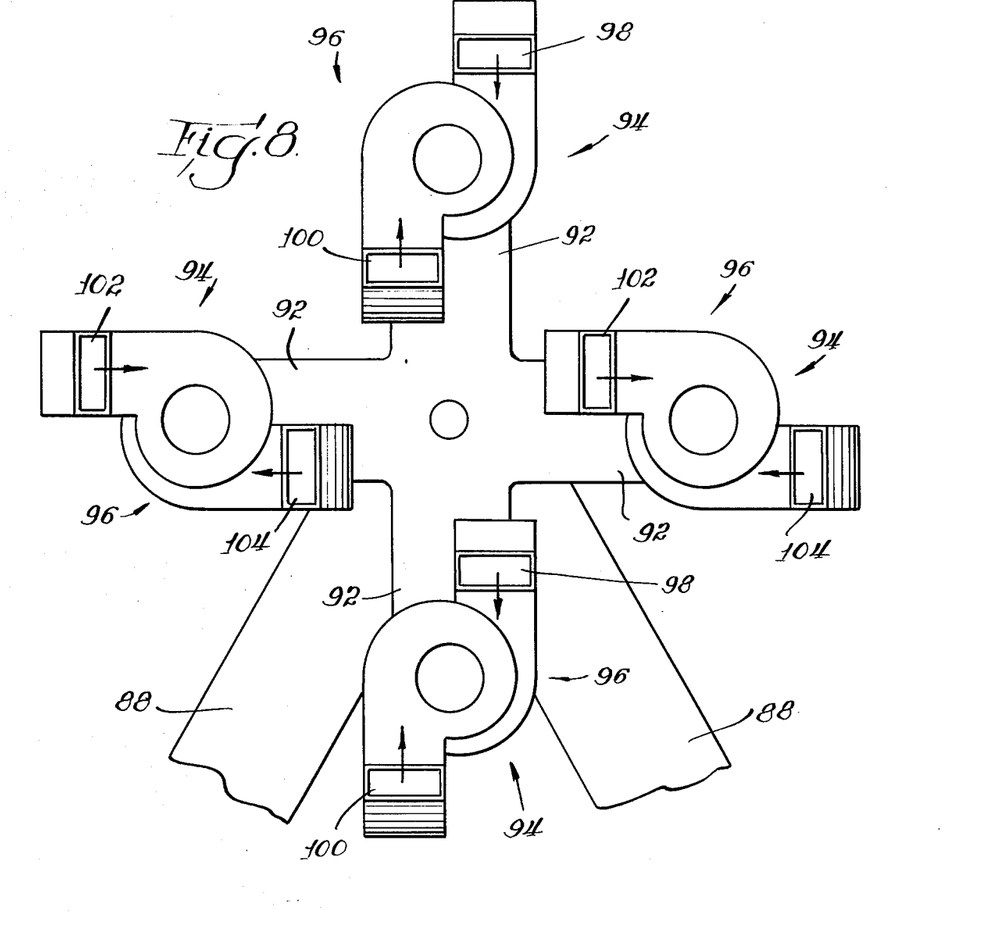
FIG. 8 is a face view of still another modified form of the invention.
Figure 9:
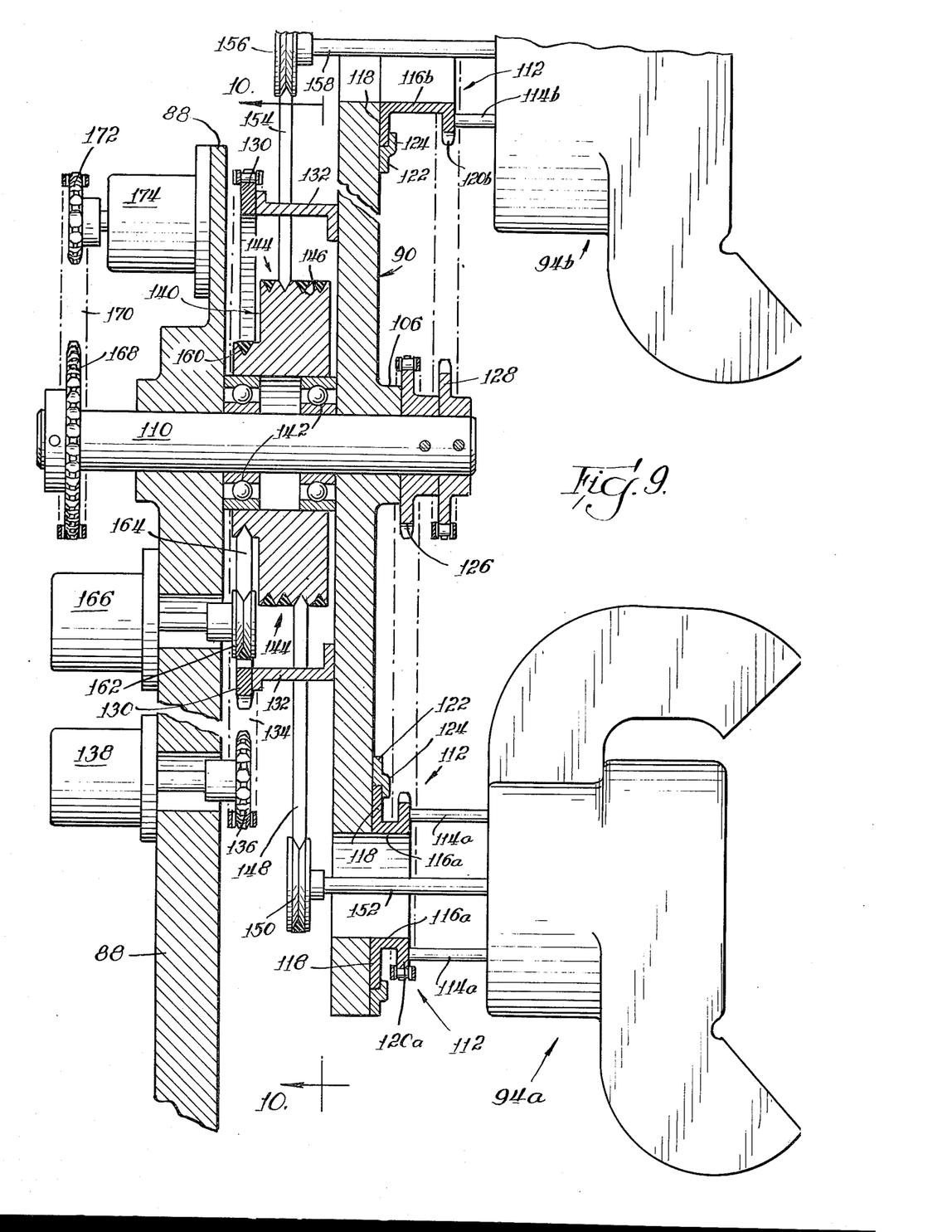
FIG. 9 is a sectional view taken along line 9—9 of FIG. 8.
Figure 10:
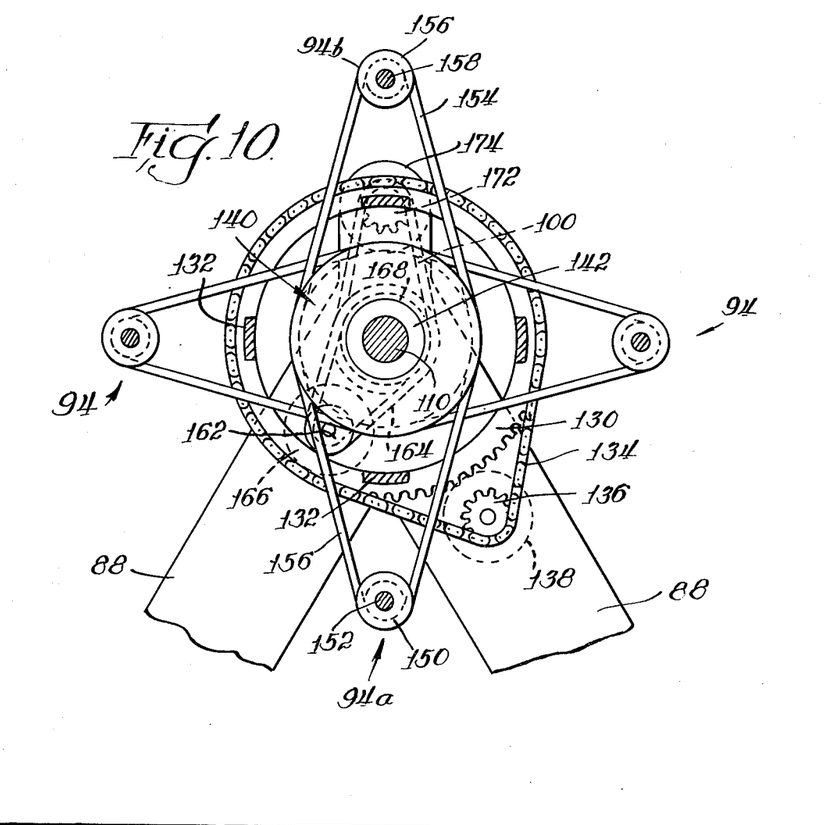
FIG. 10 is a detail view of the drive mechanisms of FIGS. 8 and 9.
Figure 11:
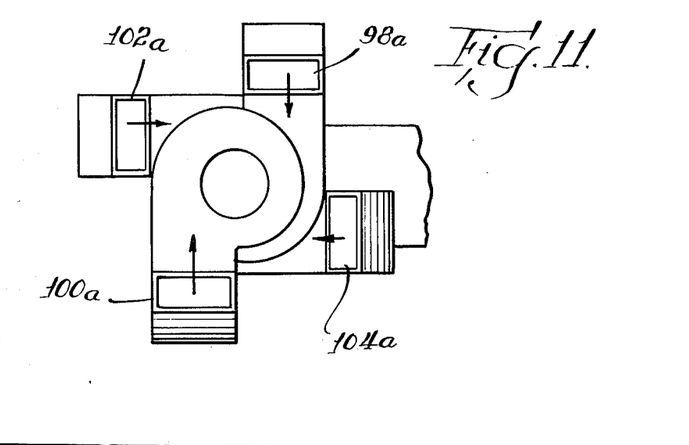
FIG. 11 is a detail view of a modified blower unit of FIG. 8.

Another form of the invention is shown in FIGS. 8, 9, 10, and 11. In FIG. 8, there is shown a rigid support 88, which is mounted on a mobile base, not shown, so that the base and the support can be moved transversely along a line of trees. Journaled in the support 88 is a spider 90, having outwardly projecting arms 92 adapted to rotate in a vertical plane oriented in the direction of transverse movement so that said plane is opposite the foliage expanse of the tree. Journaled in the ends of the arms 92 are rotating units 94 also adapted to rotate in vertical planes opposed to the foliage expanse of the trees. Each of the rotating units 94 comprise a compound fan 96, one unit of which has a nozzle 98, or 102, and the other of which has a nozzle 100, or 104. Or, if more than two units are comprised in the compound fan, there may be, in addition to nozzles 98a and 100a, nozzles 102a and 104a, according to the number of such additional units, for example, as shown in FIG. 11. The spider 90 has a hub 106 journaled on rotating shaft 110, which in turn is journaled in the support 88. Thus, the spider 90 is adapted to rotate about the shaft 110 and the rotating units 94 are adapted to rotate about axes at the ends of the arms 92 of the spider 90.

The rotating units 94 are each mounted on an annulus 112 by means of a tubular support 114. The annulus 112 comprises a central tubular portion 116, a flat annular portion 118 adapted to lie flat against the spider 90, and an annular sprocket 120. The tubular support 114 is fastened to the sprocket 120. The flat annular portion 118 of the annulus 112 is adapted to fit into the collar 122 having an overlapping portion 124. Thus, the annulus 112, with its sprocket 126, is held flush against the spider 90, and yet is free to rotate with respect thereto. The length of the tubular portion 116 and the tubular support 114 varies from one pair of diametrically opposed rotating units to a pair displaced 90 degrees therefrom. Thus, the sprockets 120a line up with sprocket 126 and and sprockets 120b line up with sprocket 128. Sprockets 126 and 128 are affixed to rotating shaft 110 and rotate therewith, so that as shaft 110 is rotated, sprockets 120 are rotated. Because of the lateral displacement of the sprockets 126 and 128, the tubular support 114a will be longer than the tubular support 114b and the central tubular portion 116a will be shorter than the central tubular portion 116b, as necessary, to bring the sprockets 120b in alignment with sprocket 128, and sprockets 120b in alignment with sprocket 126. The overall length of the tubular support 114, plus the central tubular portion 116 is the same in all cases, so that the rotating units 94 are all equally spaced from the spider 90.

The spider 90 carries a large ring sprocket 130 mounted thereon by supports 132, which sprocket is connected by chain 134 to a small sprocket 136, driven by a low-speed hydraulic motor 138, which is mounted on the support 88.

Mounted between the spider 90 and the support 88, in the space provided by the supports 132, is a multiple sheave 140, mounted to rotate freely on the rotating shaft 110 through suitable bearings 142. The sheave 140 has a plurality of V grooves 144 across its greater circumference adapted to receive V belts. One such groove is provided for each rotating unit. Thus, the groove 146 receives V belt 148, which in turn is received by the V groove pulley or sheave 150, mounted on shaft 152 which drives the fan in the rotating unit 94a. Similarly, a belt 154, driven by the multiple sheave 140, drives sheave 156, which in turn drives shaft 158, which drives the fan of the rotating unit 94b. Similar arrangements are provided whereby belts and sheaves drive the fans of the other rotating units 94. The sheave 140 has a still further V groove 160, having a smaller diameter than the V grooves 144, and is connected to the V groove pulley 162 by belt 164, and which in turn is driven by a high-speed hydraulic motor 166, which is mounted on support 88. This arrangement is such as to multiply the speed of the shafts 152, 158, and so on, several times. By this arrangement, coupled with the use of a high-speed hydraulic motor, which is continuously variable through suitable valve control of the hydraulic fluid, any fan can be speeded up or slowed down in order to get the necessary velocity for the purpose.

The rotating shaft 110 has a sprocket 168, which is connected by chain 170 to sprocket 172, which is driven by a low-speed hydraulic motor 174, which is mounted on base 88. The motor 174 rotates the shaft 110, driving the sprockets 126 and 128, in turn driving the sprockets 120, and thus causing the rotating units 94 to rotate. Since the spider is caused to rotate by motor 138, the rotation of the rotating units 94 is independently variable, as is the rotation of the sprocket 90. Similarly, since the fans of the rotating units 94 are rotated by the hydraulic motor 164, they are independently variable of the rotation of the rotating units, and of the spider.

In the operation of the device in accordance with the invention, the air blasts, advantageously, travel between about 140 and 200 miles per hour. Air blasts of much greater velocity than this are undesirable as they tend to blow through the trees and blow off foliage as well as fruit. When it is desired to produce a greater affect on the limb groupings without increasing the velocity, the size of the orifices can be enlarged, so that the volume of air passing therethrough can be increased without increasing its velocity.

It is to be understood that the invention is not to be limited to the exact details of operation or structure shown and described, as obvious modifications and equivalents will be apparent to one skilled in the art.

I claim:

1. Apparatus for harvesting fruit from trees which comprises air blast-producing means for directing a blast of air into said tree from the circumference of a circle which lies in a substantially vertical plane apposed to the foliage expanse of said tree, and moving means for causing said blast of air to move about the said circumference as a rotating unit which rotates about the center of said circle, in which said air blast-producing means comprises a plurality of nozzles spaced along said circumference and oriented to direct a blast of air into the foliage of said tree, and said moving means comprises means for shifting said blast of air from one nozzle to the next adjacent nozzle in succession.

2. Apparatus for harvesting fruit from trees which comprises air blast-producing means for directing a blast of air into said tree from the circumference of a circle which is apposed to the foliage expanse of said tree, and moving means for causing said blast of air to move about the said circumference as a rotating unit which rotates about the center of said circle, in which said air blast-producing means comprises a plurality of nozzles spaced along said circumference and oriented to direct a blast of air into the foliage of said tree, and said moving means comprises means for shifting said blast of air from one nozzle to the next adjacent nozzle in succession, and in which said nozzles comprise a plurality of louvers extending from one annulus to another, in which said air blast-producing means comprises a blower arranged to direct an annular flow of high-speed air into said louvers and in which said moving means comprises a rotary gate valve between said louvers and said blower having at least one aperture in alignment with said louvers whereby, as said rotary gate is rotated, high-speed air is admitted to said louvers in succession.

3. Apparatus of claim 2, in which said louvers are oriented at an angle in the direction of rotation of said rotary gate.

4. Apparatus for harvesting fruit from trees which comprises air blast-producing means for directing a blast of air into said tree from the circumference of a circle which lies in a substantially vertical plane apposed to the foliage expanse of said tree, and moving means for causing said blast of air to move about the said circumference as a rotating unit which rotates about the center of said circle, in which said air blast-producing means for directing a blast of air into said tree comprises at least one nozzle located on said circumference to deliver a continuous blast of air into the foliage of said tree, and said moving means comprises means for moving said nozzle along said circumference, in which said air blast-producing means comprises a blower arranged to deliver high-speed air to at least two of said nozzles which are diametrically opposed to each other and which are mounted to rotate as a unit about a common center, and in which said nozzles are oriented at an angle in the direction of rotation of said unit.

5. Apparatus of claim 4, in which said nozzles are connected to a common conduit which in turn is connected with said blower.

6. Apparatus of claim 4, in which said nozzles project from a face plate mounted on the discharge end of a rotary blower normal to the axis thereof and in communication with the high-speed air delivery of said blower, said blower being mounted to rotate as a unit about its axis.

7. Apparatus for harvesting fruit from trees which comprises air blast-producing means for directing a blast of air into said tree from the circumference of a circle which lies in a substantially vertical plane apposed to the foliage expanse of said tree, and moving means for causing said blast of air to move about the said circumference as a rotating unit which rotates about the center of said circle, in which said air blast-producing means for directing a blast of air into said tree comprises at least one nozzle located on said circumference to deliver a continuous blast of air into the foliage of said tree, and said moving means comprises means for moving said nozzle along said circumference, which comprises a second rotating unit having a second air blast-producing means for directing a blast of air into said tree from the circumference of a second circle which also lies in a substantially vertical plane apposed to the foliage expanse of said tree and which is located above said first rotating unit in position to impart a gyratory motion to the limb groupings on which said second blast impinges, and in which the first and second rotating units rotate in opposite directions, whereby gyrating limbs of one grouping tend to collide head-on with gyrating limbs of the other grouping.

8. Apparatus for harvesting fruit from trees which comprises air blast-producing means for directing a blast of air into said tree from the circumference of a circle which lies in a substantially vertical plane apposed to the foliage expanse of said tree, and moving means for causing said blast of air to move about the said circumference as a rotating unit which rotates about the center of said circle, said air blast-producing means for directing a blast of air into said tree comprises at least one nozzle located on said circumference to deliver a continuous blast of air into the foliage of said tree, and said moving means comprises means for moving said nozzle along said circumference, in which said rotating unit is mounted to move across the foliage expanse of said tree, whereby said blast of air, concomitantly with its moving about said circumference, progressively moves from one limb grouping to another and the rotating motion is impressed on the cross movement, and in which said rotating unit is mounted so that the center, of the circle about the circumference of which it travels, travels about the circumference of a second circle which also lies in a substantially vertical plane opposed to the foliage expanse of said tree, whereby the rotating movement of said air blast-producing means is impressed upon the rotating movement about the cénter of said second circle said apparatus also comprising a second rotating unit having a second air blast-producing means for directing a blast of air into said tree from the circumference of a further second circle which also lies in a substantially vertical plane apposed to the foliage expanse of said tree and which is located above said first rotating unit in position to impart a gyratory motion to the limb groupings on which said second blast impinges.

9. Apparatus of claim 8, in which the apparatus is mounted on a mobile base for movement horizontally along a row of trees, whereby the rotating movement of said air blast-producing means is impressed both on the circumferential movement of the rotating unit and on the horizontal movement of the apparatus.

10. Apparatus of claim 9, in which said mobile base carries a rigid support affixed thereto having a horizontally disposed first axle means normal to the direction of travel of said base, a spider having a hub provided with complementary first axle means adapted to rotate about said first axle means, said spider having a plurality of arms projecting radially from said hub, second axle means at the ends of said arms, compound blowers, having complementary second axle means parallel to said first axle means and being adapted to rotate about said second axle means, a nozzle connected with each section of said compound blower and mounted to direct a blast of air inwardly toward the tree.

11. Apparatus of claim 10, in which said nozzles are oriented to angle the air blast into the tree in the direction of rotation of said rotating unit.

12. A process for harvesting fruit from trees which comprises directing a blast of air into the tree from the circumference of a circle which lies in a substantially vertical plane apposed to the foliage expanse of said tree while causing said air blast to move about said circumference as a rotating unit.

13. The process of claim 12, in which the movement of said blast along said circumference is effected by intermittent blasts, each successive blast of which is farther along the circumference of the circle.

14. The process of claim 12, in which the movement of said blast along said circumference is effected by moving at least one continuous blast along said circumference.

15. The process of claim 12, in which the diameter of said circle is relatively small with reference to the foliage expanse of said tree.

16. The process of claim 15, in which the diameter of said circle is between about one-fourth and about one-half of the height of the foliage expanse of said tree.

17. The process of claim 12, in which the rate of travel of said air blast about said circumference is adjusted to correspond to the natural period of said limb grouping.

18. The process of claim 17, in which a second rotating unit is located above the first rotating unit in position to impart a gyratory motion to a limb grouping above the first limb grouping.

19. The process of claim 18, in which the first and second rotating units rotate in opposite directions, whereby gyrating limbs of one grouping tend to collide head-on with gyrating limbs of the other groupings.

20. The process of claim 15, in which said rotating unit moves across the foliage expanse of said tree, whereby said blast of air, concomitantly with its moving about said circumference, progressively moves from one limb grouping to another and the rotating motion is impressed on the cross movement.

21. The process of claim 20, in which said rotating unit moves across the foliage expanse of said tree in a vertical path, whereby the rotating movement of said air blasts is impressed on the vertical movement of said rotating units.

22. The process of claim 20, in which said rotating unit moves across the foliage expanse of said tree in a horizontal path, whereby the rotating movement of said air blasts is impressed on the horizontal movement of said rotating units.

23. The process of claim 20, in which the center of said rotating unit moves about the circumference of a second circle which also lies in a substantially vertical plane apposed to the foliage expanse of said tree, whereby the rotating movement of said air blast is impressed upon the rotating movement about the center of said second circle.

24. The process of claim 21, in which a horizontal movement is impressed upon said vertical movement and said rotating movement.

25. The process of claim 23, in which a horizontal movement is impressed upon the two rotating movements.

26. The process of claim 12, in which the air blast is oriented to angle the air blast into the tree in the direction of the rotation of said rotating unit.

27. The process of claim 15, in which the air blast is oriented to angle the air blast into the tree in the direction of the rotation of said rotating unit.

28. The process of claim 17, in which the air blast is oriented to angle the air blast into the tree in the direction of the rotation of said rotating unit.

29. The process of claim 22, in which the air blast is oriented to angle the air blast into the tree in the direction of the rotation of said rotating unit.

30. The process of claim 25, in which the air blast is oriented to angle the air blast into the tree in the direction of the rotation of said rotating unit.

* * * * *

UNITED STATES PATENT AND TRADEMARK OFFICE
CERTIFICATE OF CORRECTION

PATENT NO. : 4,175,368
DATED      : November 27, 1979
INVENTOR(S) : Edward D. Scheffler It is certified that error appears in the above—identified patent and that said Letters Patent is hereby corrected as shown below:

Col. 1, line 45; "foilage" should read — foliage —
Col. 1, line 50; "data" should read — date —
Col. 1, line 64; "foilage" should read — foliage —
Col. 2, line 18; "foilage" should read — foliage —
Col. 2, line 31; "foilage" should read — foliage —
Col. 3, line 26; "tha" should read — that —
Col. 4, line 15; "3" should read — 3-3 —

Col. 10, line 43; "opposed" should read — apposed —

Signed and Sealed this

Thirteenth Day of May 1980

[SEAL]

Attest:

SIDNEY A. DIAMOND

Attesting Officer    Commissioner of Patents and Trademarks